Oct. 6, 1953
H. J. NELSON
2,654,121
APPARATUS FOR MOLDING HAMBURGER
STEAK PATTIES AND THE LIKE
Filed June 6, 1950
3 Sheets-Sheet 1
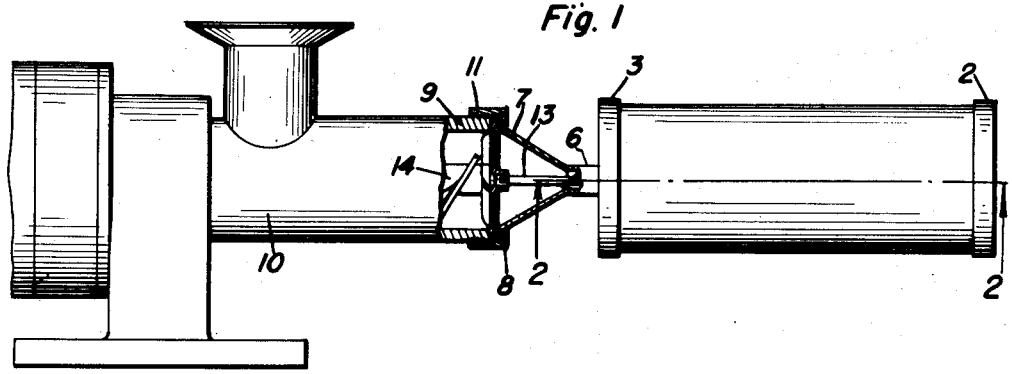
Fig. 1
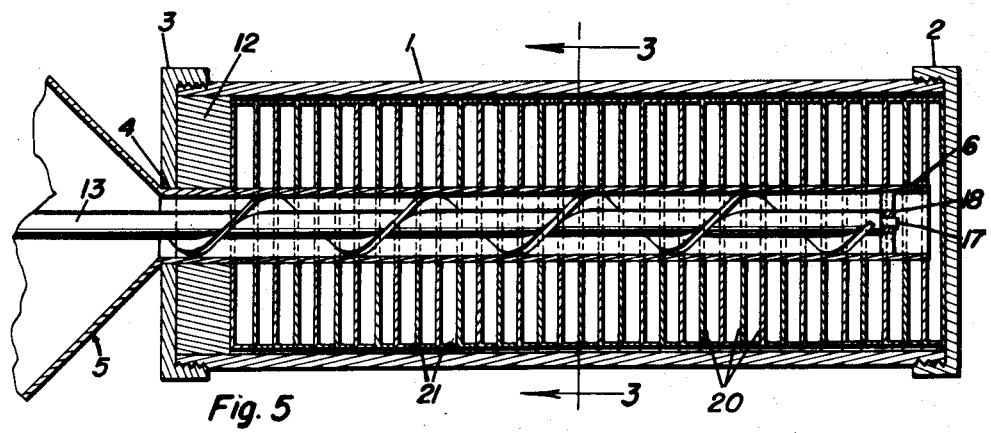
Fig. 2
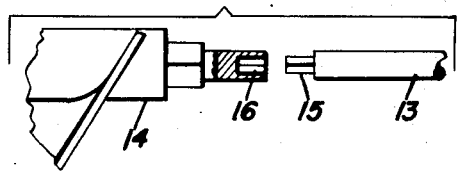
Fig. 5
Fig. 4
Fig. 3
Harry J. Nelson
INVENTOR.
BY
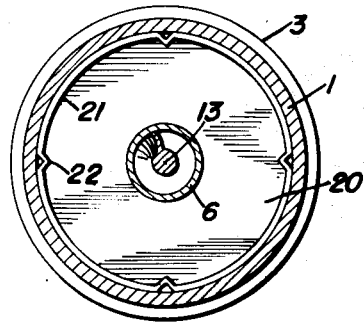
Attorneys

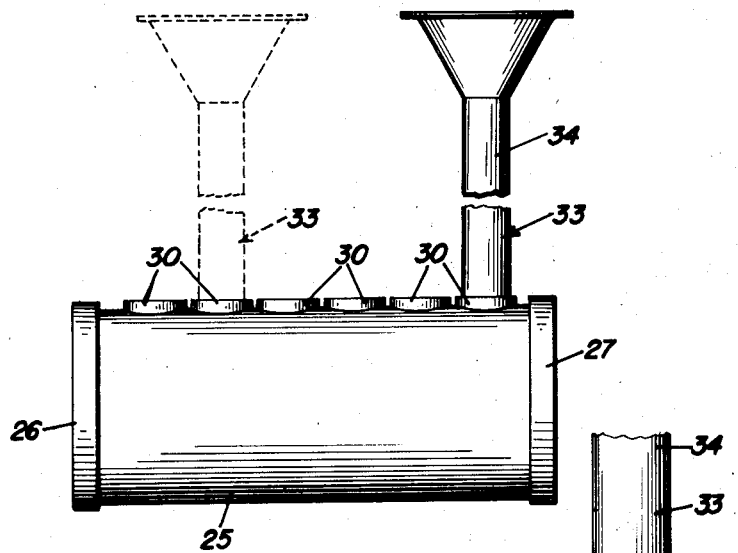
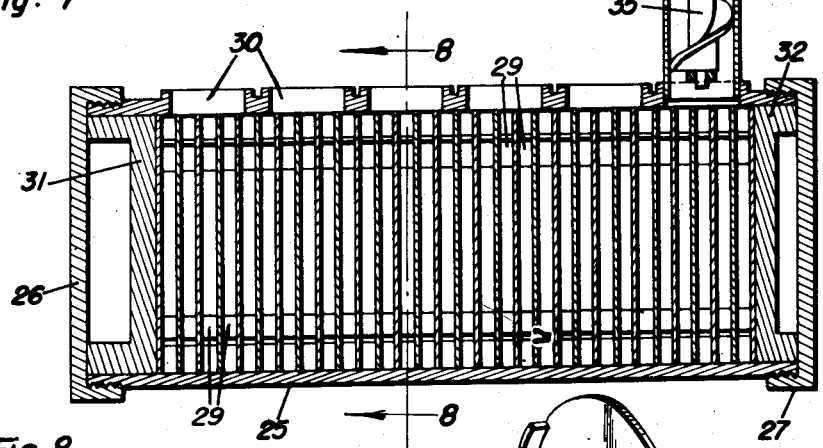
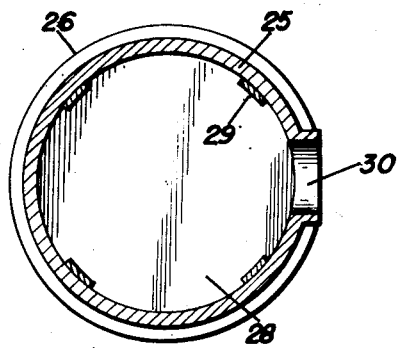
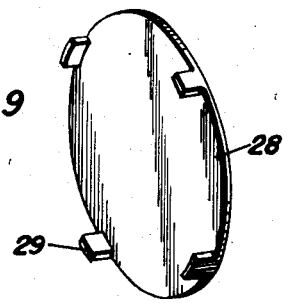

Oct. 6, 1953
H. J. NELSON
2,654,121
APPARATUS FOR MOLDING HAMBURGER
STEAK PATTIES AND THE LIKE
Filed June 6, 1950
3 Sheets-Sheet 3
Fig. 10
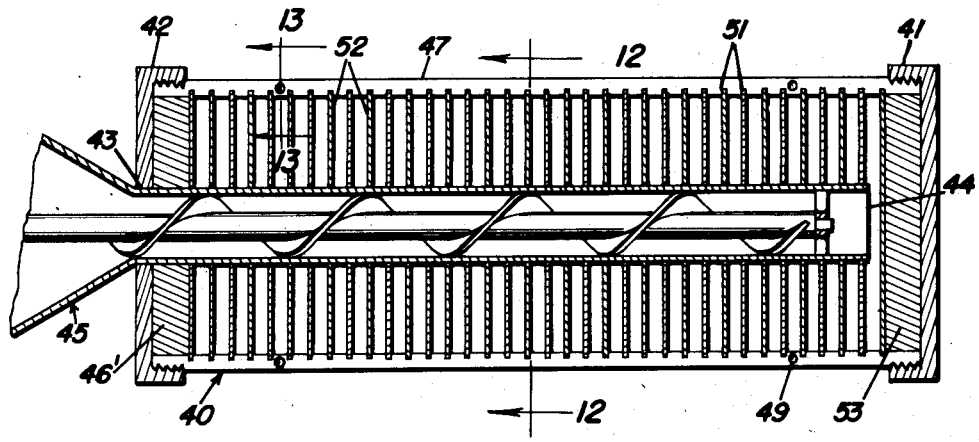
Fig. 11
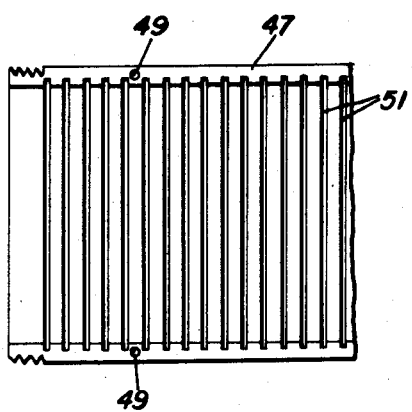
Fig. 14
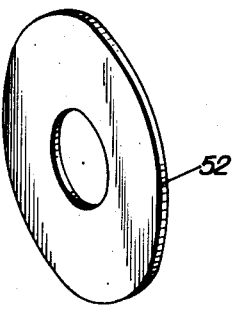
Fig. 12
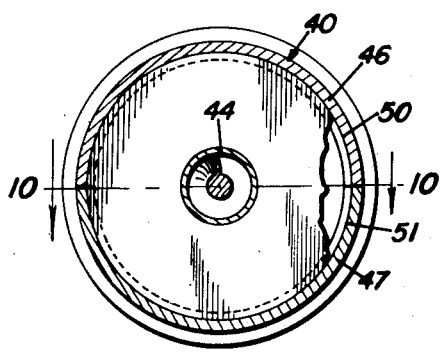
Fig. 13
Harry J. Nelson
INVENTOR.
BY
Attorneys Patented Oct. 6, 1953

2,654,121

UNITED STATES PATENT OFFICE 2,654,121

APPARATUS FOR MOLDING HAMBURGER STEAK PATTIES AND THE LIKE

Harry J. Nelson, Pocatello, Idaho

Application June 6, 1950, Serial No. 166,331

6 Claims. (Cl. 17—32)

My invention relates to improvements in apparatus for molding hamburger steak patties, the primary object in view being to provide for molding such patties, under pressure and on the conventional meat grinders of commerce, and without waste or handling of the meat after it leaves the grinder.

Another object is to provide apparatus for the purpose specified which is adapted for easy quick attachment to and detachment from the conventional grinder and for molding the patties in stacked form for convenient use or storage.

Still another object is to provide apparatus for the above purposes which is simple in construction, easy to maintain clean and sanitary, and is inexpensive to manufacture and service.

Other and subordinate objects, within the purview of my invention, together with the precise nature of my improvements will be readily understood when the succeeding description and claims are read with reference to the drawings accompanying and forming part of this specification.

In said drawings:

Figure 1 is a view in side elevation, partly broken away and shown in section, of the preferred embodiment of my improved apparatus;

Figure 2 is a fragmentary view in horizontal section taken on the line 2—2 of Figure 1 and drawn to a larger scale;

Figure 3 is a view in transverse section taken on the line 3—3 of Figure 2;

Figure 4 is a view in perspective of one of the pattie forming members or disks;

Figure 5 is a fragmentary view in side elevation, partly in section, illustrating the connection for coupling the screw feed shaft of the apparatus to the screw feed shaft of the meat grinder;

Figure 6 is a view in side elevation of a modified embodiment of my invention;

Figure 7 is a vertical, longitudinal section of the same drawn to a larger scale;

Figure 8 is a view in transverse section taken on the line 8—8 of Figure 7;

Figure 9 is a view in perspective of one of the pattie forming disks, or members, of the modified embodiment;

Figure 10 is a fragmentary view in horizontal section of a second modified embodiment of my invention, taken on the line 10—10 of Figure 12;

Figure 11 is a fragmentary view in plan of one of the casing sections of the second modified embodiment;

Figure 12 is a view in transverse section taken on a line 12—12 of Figure 10;

Figure 13 is a fragmentary view in transverse section illustrating the means for fitting the sections of the casing together, in the second modified embodiment, and drawn to a still larger scale;

Figure 14 is a view in perspective of one of the pattie forming disks, or members, of the second modified embodiment.

Referring to the drawings by numerals, and first to Figures 1 to 5 thereof, the apparatus of my invention, in the preferred embodiment thereof, comprises a hollow cylindrical casing 1 preferably of transparent plastic, and of any suitable length. A solid closure cap 2 of the same material is detachably threaded onto what constitutes the front end of said casing 1, and a similar closure cap 3 is similarly attached to the opposite rear end of said casing and provided with a comparatively small axial bore therein, and designated 4.

A meat feeding unit 5 carries the casing 1, in a manner presently described, and comprises a feed tube 6 slidably extending through the bore 4 of the cap 3 into said casing 1 coaxially therewith, said tube 6 being provided with a flaring rear end mouth section 7 having an external rim flange 8 of the same size as the discharge end 9 of the conventional meat grinder, designated 10.

A flanged adapter ring 11 threaded onto said end 9 of the meat grinder 10 and against said flange 8 detachably attaches the rear end section 7 of said tube 6 to said grinder 10 to receive meat discharged from said grinder 10, and so that said unit 5 extends axially forwardly of said grinder 10 with the casing 1 supported by said tube 6 for sliding thereon.

An annular stabilizing follower 12 removably fitted in the rear end of the casing 1 and slidable on the tube 6 prevents said cap 3 from binding on said tube 6.

A screw feed shaft 13 of the helical blade type coacts with the tube 6 to feed meat forwardly through said tube. The screw feed shaft 13 is detachably coupled to the meat grinder shaft 14 for rotation thereby and through the means of a reduced polygonal rear end 15 on said shaft 13 adapted to fit in a polygonal socket 16 in said meat grinder shaft. The front end of the screw feed shaft 13 is reduced, as at 17, and journaled in a spider bearing 18 suitably fixed in the front end of said tube 6. The spiral blade 19 on the screw feed shaft 13 rotates in said tube 6 to feed meat forwardly out of said tube.

A plurality of annular pattie forming disks, or members, 20 of any suitable thin rigid metal, and each provided with a rim flange 21 are slidably fitted in the casing 1 in engaging relation with the rims 21 facing forwardly, and are also slidably fitted on the feed tube 6 to slide along said tube with said casing 1. The pattie forming disks, or members, 20, as will be clear, provide annular pattie forming pockets therebetween and are held engaged by being clamped between the cap 2 and the follower 12. The rims 21 of the pattie forming disks or members 20 may be crimped, as at 22, for reinforcing purposes.

As best shown in Figure 2, the casing 1 is longer than the feed tube 6 by substantially the depth of one pattie forming pocket, and the rear end mouth section 7 of the feed tube 6 forms a stop against which the casing 1 may be slid to space the front end of said feed tube from the cap 2 a distance corresponding to the width of the front pattie forming pocket in the casing 1, whereby the normal starting position of the casing 1 and said disks, or members, 20 is established and said tube 6 will then discharge into the front end or leading pattie forming pocket in said casing 1.

Referring now to the operation of the described embodiment of my invention, with the meat feeding unit 5 attached to the grinder 10, as described, and the casing 1 and disks, or members, 20 in the normal position described on said tube 6, the ground meat forced out of the meat grinder 10 will enter the mouth section 7 and be forced into the feed tube 6 to be fed forwardly therein by the screw feed shaft 13 and out of said tube 6 into the leading or front end pattie forming pocket in the casing 1 to fill said pocket and compress the meat therein. As the leading pattie forming pocket becomes filled and packed, the pressure exerted by the meat, under feed by said screw feed shaft 13, will cause the casing 1 and disks, or members, 20 to slide forwardly along the feed tube 6 to fill the succeeding pattie forming pocket, and this operation will continue until all of said pockets are filled successively beginning at the front end of said casing 1. At this point, the casing 1 may be slid off the front end of the feed tube 6, the cap 3 and follower 12 removed and said casing stood on its rear end and lifted to slide the disks, or members, 20 and the formed patties out of said casing in a stack in which the patties are separated by said disks, or members, 20. The patties may then be used as desired, or the stack stored as a stack.

In the modified embodiment shown in Figures 6 to 9, a hollow cylindrical casing 25 is provided with end closure caps 26, 27 detachably threaded thereon, said casing containing pattie forming disks 28 spaced apart by lateral edge lugs 29 on each disk to provide pattie forming pockets between said disks as in the preferred embodiment. The pattie forming disks 28 are slidably fitted in the casing 25 for insertion therein and removal therefrom as will be clear.

A plurality of longitudinally spaced filler necks 30 are provided on one side of said casing 25 for introducing meat into said casing. A pair of spacer plugs 31, 32 removably fitted in the ends of said casing 25 and retained therein by the caps 26, 27 coact with the spacing lugs 29 and the pattie forming disks 28 to space said disks with respect to the feed necks 30 so that ground meat may be introduced through said necks 30 into groups of pattie forming pockets, and all of the pockets may be filled through said necks.

A meat feeding unit 33, like the described unit 5, and of which said necks 30 form a part is provided for use with the casing 25 and the pattie forming disks 28 of the modified embodiment, the front end of the feed tube 34 of said unit 33 being designed to frictionally fit in each neck 30, as represented by the full and dotted lines in Figures 6.

In operating this modified embodiment, the casing 25 is manipulated to fit the front end of the feed tube 33 in the filler necks 30, successively, beginning from either end of said casing 25 so that the screw feed shaft 35 of the unit 33 will successively fill and compress ground meat in the groups of pattie forming pockets. After all said pockets are filled, either cap 26, or 27, and the adjacent spacer plugs 31, or 32, may be removed, and the casing 25 up ended to permit the formed patties and the pattie forming disks 28 to slide out of the casing 25 in stacked form for use as desired.

In the modified embodiment of my invention shown in Figures 10 to 13, a hollow cylindrical casing 40 is provided with front and rear end closure caps 41, 42 detachably threaded thereon, the rear cap 42 having an axial bore 43 therein through which the feed tube 44 of a meat feeding unit 45, like the unit 5, is slidably extended, and also slidably extended through an annular follower 46' like the follower 12. The casing 40, in this instance, is split longitudinally into casing half sections 46, 47 for separation, for a purpose presently seen, and which are secured together by said caps 41, 42. Nubs 48 on the side edges of the casing half sections 46 fitting into sockets 49 in the side edges of the other casing half sections 47 provide for fitting of said sections together edge to edge in proper relation for attaching said caps 41, 42. The casing sections 46, 47 are provided with opposite, internal, circumferential grooves 50, 51 equidistantly spaced apart in said sections and in which annular pattie forming disks 52 are detachably fitted to provide pattie forming pockets in said casing 40 for filling and packing with ground meat from the grinder 10 all in the same manner as described with reference to the preferred embodiment of the invention. A circular removable spacer 53 is provided in the front end of the casing 40 and which together with the follower 46 braces the ends of said casing 40 and spaces the disks 52 inwardly clear of the caps 41, 42.

In the second described modified embodiment, when the pattie forming pockets are filled and packed, and the casing 40 slid off the feed tube 44, the caps 41, 42 are detached and the casing sections 46, 47 separated while stood on end to arrange the molded patties in stacked form and separated by said disks 52. Otherwise, the use and operation of this embodiment is the same as described with reference to the preferred embodiment.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described my invention, what is claimed as new is:

1. In combination, a food grinder having a discharge end and a rotary grinder shaft terminating at said end, a food feed device at said discharge end comprising a tube having a rear mouth end and a front outlet end, means attaching the mouth end of the tube to said discharge end to receive food from said discharge end, screw feed means attached to said grinder shaft for operation thereby and extended into said tube to force the food therethrough and out of said outlet end under compression, a hollow cylindrical casing surrounding said tube concentrically thereof, an annular closure for one end of the casing slidable on the tube and supporting said casing for endwise movement along said tube, a solid closure for the other end of the casing spaced outwardly of the outlet end of the tube so that said tube will feed food under compression into said casing to move the same outwardly of said outlet end of the tube, and a series of annular partition members fitted in said casing and around said tube in laterally spaced relation and in successive arrangement from said last-named end of the casing and forming a series of correspondingly arranged and successive pockets in said casing, said members being slidable along said tube and off the outlet end of the tube under movement of the casing to position said pockets successively at the outlet end of the tube for filling under compression successively to mold the food into patties in the casing.

2. The combination of claim 1, said partition members being provided with peripheral spacers for spacing the same apart.

3. The combination according to claim 1, said partition members having lateral peripheral flanges spacing the same apart.

4. Apparatus for molding into patties food material forced under compression from the discharge end of a food grinder by the rotary grinder shaft comprising a food feeding device including a tube having a front outlet end and a rear mouth end attachable to said discharge end to receive food from said discharge end, screw feed means attachable to said grinder shaft for operation thereby and extending into said tube to force the food therethrough and out of said outlet end under compression, a hollow cylindrical casing surrounding said tube concentrically thereof, an annular closure for one end of the casing slidable on said tube and supporting the casing for endwise movement along the tube, a solid closure for the other end of the casing spaced outwardly of the outlet end of the tube so that the tube will feed food under compression into said casing to move the same outwardly of said outlet end of the tube, and a series of annular partition members fitted into said casing and around the tube in laterally spaced relation in successive arrangement from the last-named end of the casing and forming a series of correspondingly arranged and successive pockets in said casing, said members being slidable along said tube and off the outlet end of the tube under movement of the casing to position said pockets successively at the outlet end of the tube for filling under compression successively to mold successive patties in the casing.

5. Apparatus according to claim 4, wherein said members comprise disks, and said casing is provided with internal grooves in which said disks are fitted to space the disks apart and from which said disks are removable when said casing is opened.

6. Apparatus according to claim 4, wherein said members comprise disks, and said casing is provided with internal grooves in which said disks are fitted to space the disks apart and from which said disks are removable when said casing is opened, said casing comprising longitudinal sections, separable to open said casing.

HARRY J. NELSON.

References Cited in the file of this patent

UNITED STATES PATENTS

| Number | Name | Date |
| --- | --- | --- |
| 366,706 | Williams, Jr. | July 19, 1887 |
| 873,559 | Koontz | Dec. 10, 1907 |
| 1,471,727 | Gomez | Oct. 23, 1923 |
| 1,486,445 | Mayol | Mar. 11, 1924 |
| 2,011,989 | Vogt | Aug. 20, 1935 |
| 2,036,367 | Shinn et al. | Apr. 7, 1936 |
| 2,076,488 | Wiley | Apr. 6, 1937 |
| 2,099,638 | Wiley | Nov. 16, 1937 |

FOREIGN PATENTS

| Number | Country | Date |
| --- | --- | --- |
| 447,168 | Great Britain | May 13, 1936 |